(12) United States Patent
Zimmer et al.

(10) Patent No.: US 7,082,509 B2
(45) Date of Patent: Jul. 25, 2006

(54) METHOD AND SYSTEM FOR ALLOCATING MEMORY DURING SYSTEM BOOT TO REDUCE OPERATING SYSTEM MEMORY RESOURCE CONSUMPTION AT RUN-TIME

(75) Inventors: Vincent J. Zimmer, Federal Way, WA (US); Michael A. Rothman, Gig Harbor, WA (US)

(73) Assignee: Intel Corporation, Santa Clara, CA (US)

( * ) Notice: Subject to any disclaimer, the term of this patent is extended or adjusted under 35 U.S.C. 154(b) by 392 days.

(21) Appl. No.: 10/361,121

(22) Filed: Feb. 6, 2003

(65) Prior Publication Data
US 2004/0158828 A1    Aug. 12, 2004

(51) Int. Cl.
G06F 12/00    (2006.01)
(52) U.S. Cl. .................. 711/170; 711/202; 711/203; 711/173; 711/220
(58) Field of Classification Search .............. None
See application file for complete search history.

(56) References Cited

U.S. PATENT DOCUMENTS

| | | | |
|---|---|---|---|
| 6,694,346 B1 * | 2/2004 | Aman et al. ............... 718/104 |
| 6,912,625 B1 * | 6/2005 | Foster et al. .............. 711/153 |
| 2002/0049719 A1 * | 4/2002 | Shiomi et al. ............. 707/1 |
| 2003/0033512 A1 * | 2/2003 | Austen et al. ............. 713/2 |
| 2004/0060041 A1 * | 3/2004 | Demsey et al. ........... 717/151 |

* cited by examiner

Primary Examiner—Reginald G. Bragdon
Assistant Examiner—Craig E Walter
(74) Attorney, Agent, or Firm—Blakely, Sokoloff, Taylor & Zafman LLP

(57) ABSTRACT

A method and system for allocating memory during system boot to reduce operating system memory resource consumption at run-time. A memory heap comprising a portion of a computer system memory in which a first class of firmware components are to be loaded is allocated. Firmware components are then selectively loaded into the system memory during system boot operations, wherein firmware components corresponding to the first class are loaded into the memory heap, while other firmware components are loaded into other portions of the system memory. A memory map corresponding to the physical memory configuration at the completion of system boot is then handed off to an operating system, which provides a virtual mapping of the physical memory such that the first class of firmware components may be accessed at run-time via virtual address calls. In one embodiment the first class of firmware components comprise run-time services.

30 Claims, 7 Drawing Sheets

METHOD AND SYSTEM FOR ALLOCATING MEMORY DURING SYSTEM BOOT TO REDUCE OPERATING SYSTEM MEMORY RESOURCE CONSUMPTION AT RUN-TIME

FIELD OF THE INVENTION

The field of invention relates generally to computer systems and, more specifically but not exclusively relates to a memory allocation scheme during system boot that facilitates a reduction in memory resources consumed by an operations system during run-time operations.

BACKGROUND INFORMATION

Computer platform firmware is used during initialization of computer systems to verify system integrity and configuration. It also generally provides the basic low-level interface between hardware and software components of those computer systems, enabling specific hardware functions to be implemented via execution of higher-level software instructions contained in computer programs that run on the computer systems. In many computers, a primary portion of this firmware is known as the Basic Input/Output System (BIOS) code of a computer system. The BIOS code comprises a set of permanently recorded (or semi-permanently recorded in the case of systems that use flash BIOS) software routines that provides the system with its fundamental operational characteristics, including instructions telling the computer how to test itself when it is turned on, and how to determine the configurations for various built-in components and add-on peripherals.

In a typical PC architecture, the BIOS is generally defined as the firmware that runs between the processor reset and the first instruction of the Operating System (OS) loader. This corresponds to the startup operations performed during a cold boot or in response to a system reset. At the start of a cold boot, very little of the system beyond the processor and firmware is actually initialized. It is up to the code in the firmware to initialize the system to the point that an operating system loaded off of media, such as a hard disk, can take over.

Typically, firmware code is stored in a "monolithic" form comprising a single set of code that is provided by a platform manufacturer or a BIOS vendor such as Phoenix or AMI. Various portions of the single set of code are used to initialize different system components, while other portions are used for run-time (i.e., post-boot) operations. In other situations, a monolithic BIOS may be extended using one or more "Option ROMs" that are contained on one or more periphery device cards. For example, SCSI device driver cards and video cards often include an option ROM that contains BIOS code corresponding to services provided by these cards. Typically, firmware in option ROMs is loaded after the firmware in the monolithic BIOS has been loaded or during loading of the monolithic BIOS in accordance with a predefined scheme.

Today's firmware architectures include provisions for extending BIOS functionality beyond that provided by the BIOS code stored in a platform's BIOS device (e.g., flash memory). More particularly, the Extensible Firmware Interface (EFI) (http://developer.intel.com/technology/efi) enables firmware, in the form of firmware modules and drivers, to be loaded from a variety of different resources, including primary and secondary flash devices, option ROMs, various persistent storage devices (e.g., hard disks, CD ROMs, etc.), and even over computer networks. Furthermore, modern operating systems map the physical addresses of run-time BIOS services corresponding to these EFI modules and drivers into virtual addresses on an individual basis. These virtual mappings consume valuable memory resources and are inefficient.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION OF PREFERRED EMBODIMENTS

Embodiments of method for allocating memory during pre-boot in a manner that facilitates efficient hand-off to an operation system and computer apparatus for implementing the method are described herein. In the following description, numerous specific details are set forth, such as embodiments pertaining to the EFI framework, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
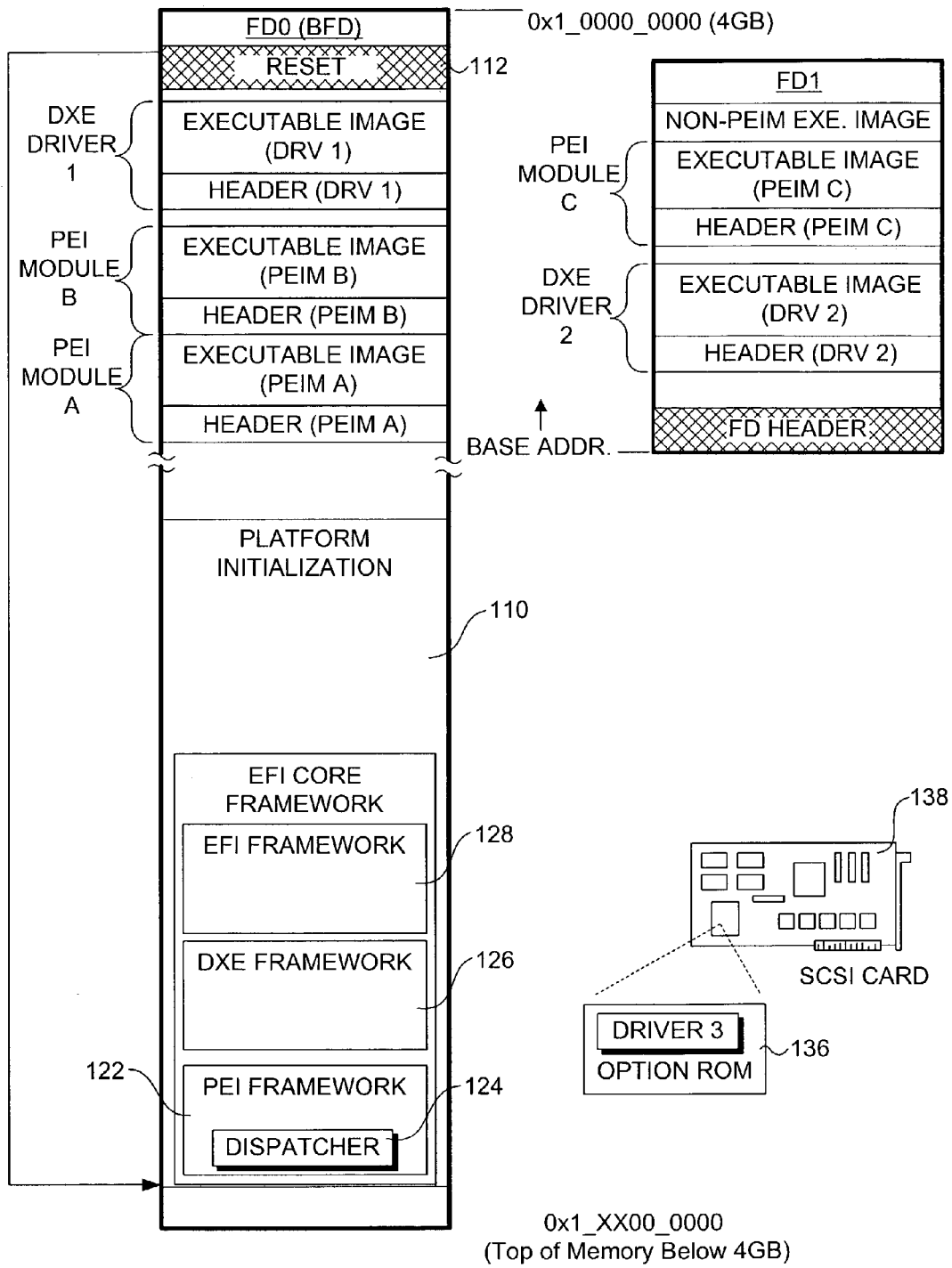
FIG. 1 is a schematic diagram of a boot firmware device, an additional firmware device, and a peripheral card with an option ROM, illustrating exemplary storage locations for firmware components that may be loaded during system boot under one embodiment of the invention.
Figure 2:
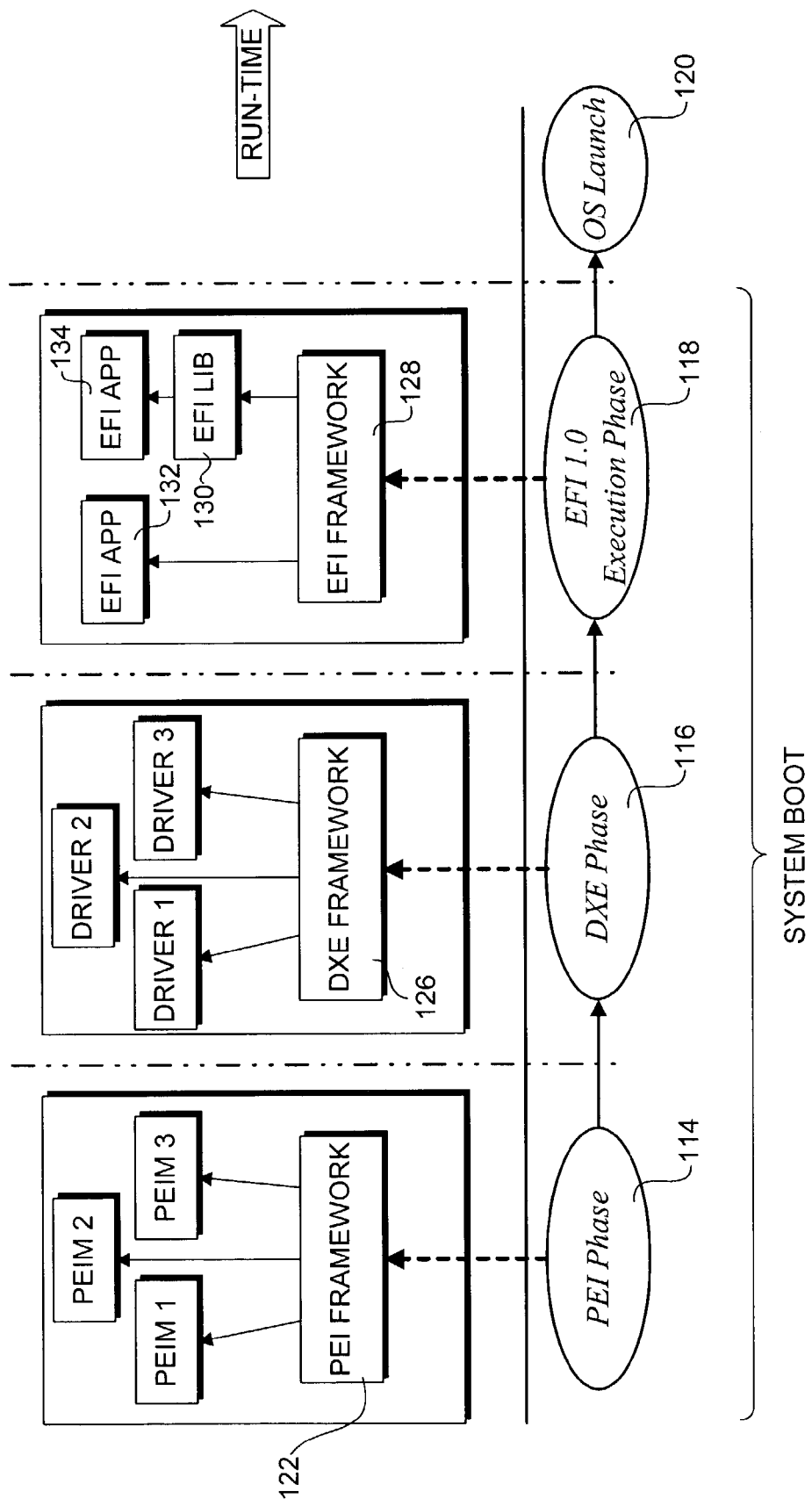
FIG. 2 is a block schematic diagram illustrating a segregated multi-phase computer system initialization scheme corresponding to a system boot under the extensible firmware interface framework.

With reference to FIG. 1, in response to a cold boot or system reset, the instruction pointer of a computer system's microprocessor is directed to the first instruction in a set of platform initialization firmware code 110 that is stored on a firmware device (FD) 0. This firmware device, often referred to as the BIOS chip, comprise the boot firmware device (BFD) for the system. Execution of the platform initialization firmware begins at a reset code portion 112, and proceeds sequentially until all of the firmware to initialize the computer system has been executed. Under the EFI 2.0 architecture, this initialization process includes various execution phases of the firmware, as shown in FIG. 2. These execution phases, which include a Pre-EFI Initialization (PEI) phase 114, a Driver eXecution Environment (DXE) phase 116, and an EFI 1.0 execution phase 118, enable initialization and set-up of various platform devices and services, and enable an operating system (OS) to be booted in accordance with an OS launch phase 120. Accordingly, the phases preceding the OS launch phase are collectively referred to herein as the system boot phase or simply "system boot." It is noted that this phase is also commonly referred to as "pre-boot," meaning the phase corresponding to system initialization that occurs prior to an operations system boot.

The PEI phase is responsible for main memory initialization and setting up enough of the platform fabric and resources to hand-off control to the DXE phase. As such, the firmware code that is executed to perform the PEI phase includes an Instruction Set Architecture (ISA)-specific PEI core 122, which is also referred to as PEI framework 122. The PEI framework includes firmware corresponding to a dispatcher 124, which upon execution is used to locate and dispatch for execution one or more Pre-EFI initialization modules, also referred to herein as PEI Modules or PEIMs. Firmware code in the PEIMs is used to abstract the particular platform, chipset, and policy abstractions from the baseboard.

During the DXE phase, an ISA-specific DXE core (i.e., DXE framework 126) is executed, enabling one or more DXE drivers to be loaded. The DXE drivers are responsible for providing input/output (I/O) services, such as block device abstraction, consoles, and the EFI file system. These drivers include a distinguished driver called the Boot-Device Selection (BDS) that is responsible for abstracting the operation system load and console selection policy.

During the EFI 1.0 execution phase, firmware code corresponding to an EFI framework 128 that provides core EFI operations is executed. The EFI framework also registers an EFI library 130, and one or more EFI applications 132 and 134. The EFI applications are non-persistent executable images that are used for transient services, such as platform setup, clock setting, etc.

Each of the PEIMs and the DXE drivers may be provided by the microprocessor vendor (e.g., Intel), the platform manufacturer or integrator (e.g., Hewlett-Packard, Dell, Compaq, etc.), a BIOS vendor (e.g., AMI, Phoenix, etc.), or an independent third party. Firmware code corresponding to the PEIMs and DXE drivers provided by a microprocessor vendor or platform manufacturer will typically be stored in the BFD and/or another firmware device that is accessible to the platform (e.g., mounted to the platform's baseboard) and is included in the original computer system. For example, as shown in FIG. 1, firmware code corresponding to a PEIM module A, a PEIM module B and a DXE driver 1 are stored on FD0, while a PEIM module C and a DXE driver 2 are stored on a firmware device FD1. Similarly, PEIM and DXE driver firmware code provided by a BIOS vendor will generally be stored on the BFD and/or another baseboard-mounted firmware device. DXE drivers may also be stored in option ROMs that are provided with various add-on peripheral cards, such as SCSI driver cards that are used to drive SCSI devices, depicted by a DXE driver 3 stored on an option ROM 136 on a SCSI peripheral card 138. PEIMs and DXE drivers may also be loaded from persistent storage (e.g., hard disks, CD-ROM drive, floppy drives, etc, or via a computer network (both not shown).

Transient services that are only applicable during the system-boot phase, including most PEIMs and EFI applications, are referred to herein as "boot" services. Non-transient code that provide services that are available both during and after system boot operations are termed run-time services. Many of the boot and run-time services require memory allocation. Today, most firmware, such as EFI, uses a FCFS (First-Come First Served) methodology to satisfy any memory allocation requests. These requests can include both boot-service memory allocations, which typically are reclaimed by the operating system, and runtime memory allocations; the latter are owned by the firmware and must be respected by the operating system (i.e., not garbage-collected by the OS).

Figure 3:
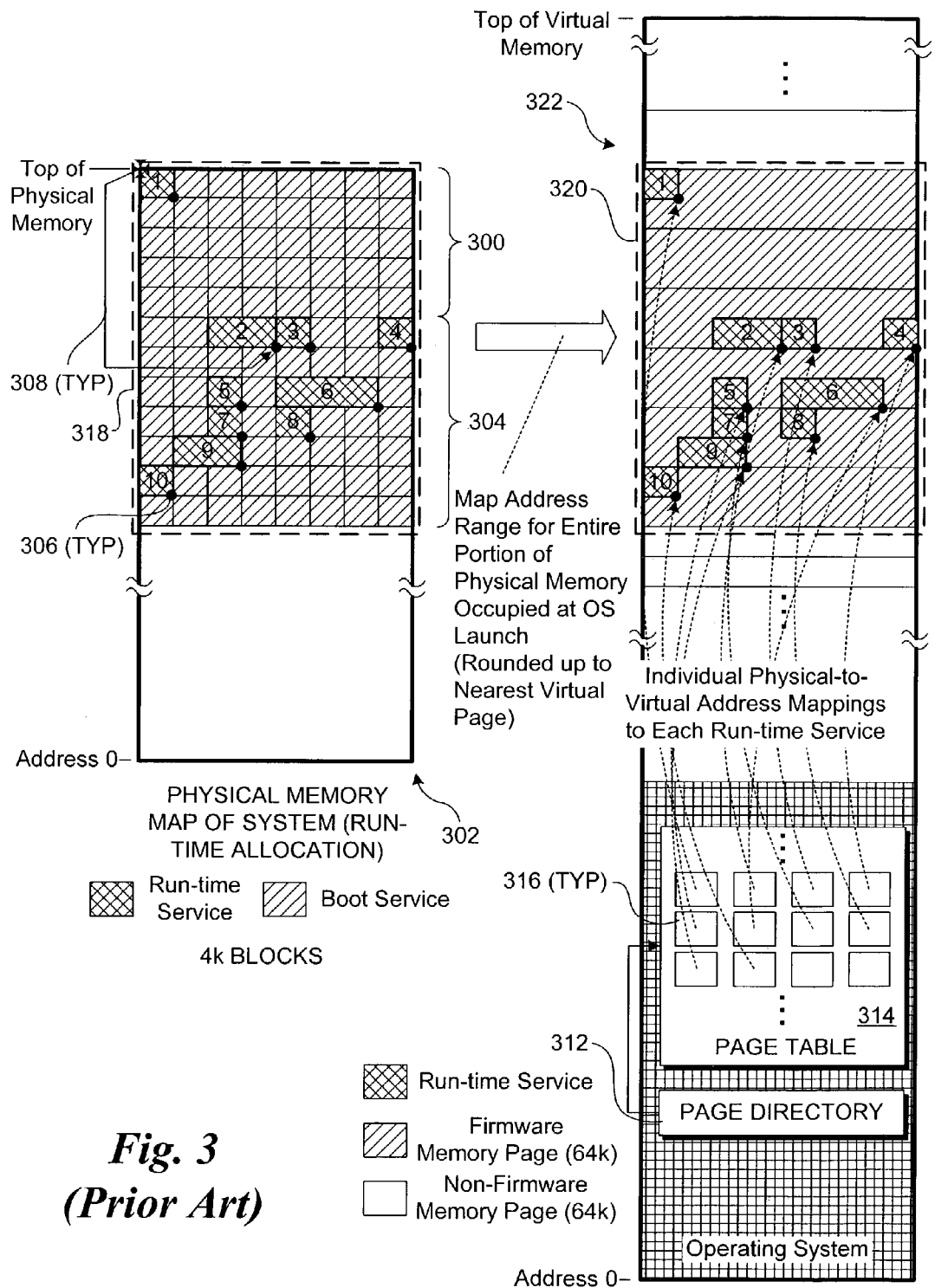
FIG. 3 is schematic diagram illustrating where firmware components are loaded into physical (i.e., system) memory during system boot, and the resultant virtual mapping of that memory by an operating system at run-time in accordance with conventional practices.

As illustrated in FIG. 3, the FCFS memory allocation scheme will generally result in a "scattering" of run-time service code. Typically, the first portion 300 of a system's physical memory 302 will primarily be allocated to transient boot services in accordance with PEI phase 114. A next portion 304 of the memory will then contain a mixture of boot and run-time services, corresponding to memory allocations that occur during the DXE and EFI execution phases. Generally, a block-wise memory allocation scheme will be employed, wherein the block size will typically be small, such as 4 k (illustrated) or 8 k blocks. Respective modules and drivers will request a given memory allocation, and a memory allocation component will allocate a sufficient number of blocks to accommodate the request. Under one embodiment of the FCFS memory allocation scheme, blocks are allocated from the top of physical memory downward in sequence, as illustrated in FIG. 3. Thus, since memory is allocated sequentially on an FCFS basis, portions of the memory will typically contain randomly ordered run-time and boot services corresponding to the ordering of the requests.

In accordance with another aspect of the system boot memory usage, all modules and drivers are accessed using a fixed address scheme based on a base address corresponding to the block(s) allocated for that component. This is to enable, in part components to use services exposed by other components. It also provides a simple scheme for storing and accessing code corresponding to the boot and run-time BIOS services.

An example of this fixed addressing scheme is shown in FIG. 3. The starting or "base" address of each memory block is based on an offset from a datum point, which in the illustrated embodiment is the top of the physical memory, as depicted by a base block address 306 and an offset 308. Code for a given service is accessed based on the base address for that service's block(s) and any applicable internal offset within the block.

While this fixed addressing scheme is very efficient during system boot, it presents a burden during run-time operating system operations. For example, many modern operating systems, such as Microsoft Windows, prefer to use virtual addressing over physical addressing. To support such virtual addressing schemes, physical memory addresses are mapped into virtual memory addresses on a block-wise basis. Virtual addressing can be handled in two ways: by the OS itself (inefficient), or through assistance from built-in support by the processor the OS is running on (very efficient). Modern processors, such as Intel processors that employ the IA32 architecture (e.g., Pentium 4), employ a built-in paging scheme for supporting virtual addressing. Optionally, a similar "virtual" paging scheme may be implemented by the OS. These paging schemes typically include a page directory 312 (providing a first level of granularity) and a page table 314 (providing a finer level of granularity). The page table includes a plurality of page table entries (PTE) 316 that are used to map blocks of physical memory (based on the starting physical address of the blocks) to corresponding virtual memory pages defined by that PTE.

During the operation system load (i.e., during OS launch phase 120), a memory map identifying the location and type of each of the boot and run-time services is "handed-off" to the OS. As discussed above, it is necessary to provide a scheme that maintains the relative offsets between the various firmware services such that they may access one-another. In one conventional embodiment, these offsets are maintained relative to the datum point, wherein the entire portion of memory 318 that was allocated during system boot operations is remapped into a corresponding portion 320 of virtual memory 322. Individual page table entries 316 are then used to point to the starting address of each of the run-time services. In order to maintain a proper offset to the address of each service, the entire page is marked as owed by the system firmware. Furthermore, although the size of a given run-time service may be as small as 4 k, the operating system has to pad these disparate allocations to match it's internal page size (which may be 4 k, 8 k, 64 k 256 k, etc.).

The foregoing scheme is inefficient. First, it consumes a PTE resource for each run-time service. This increases the number of PTEs, reducing memory availability for other purposes, and necessitating additional CPU cycles because of increased PTE access at run-time. It also consumes memory that was previously employed for storing BIOS boot services, which are no longer needed during post-boot operations.

In accordance with aspects of the invention, the foregoing problems are addressed by coalescing the run-time services in a runtime heap reserved in physical memory and then mapping only the run-time heap portion of physical memory into virtual memory. For example, with reference to the flowchart of FIG. 4, and the memory allocation scheme of FIG. 5, in one embodiment this process begins by restarting the computer system, as depicted by a system restart block 400. In a block 402 the chipset is powered on, and basic memory configuration is performed during memory initialization operations. For all of the available physical memory, a top of physical memory address X is identified, along with a memory size S. For most 32-bit platforms, X and S will have the same value, although there may be configurations in which S exceeds X. For 64-bit platforms, X and S may be generally unrelated. It is noted that X will generally not coincide with that system's maximum addressable memory address, but rather corresponds to the address of the top of the memory installed in the platform.

Figure 5:
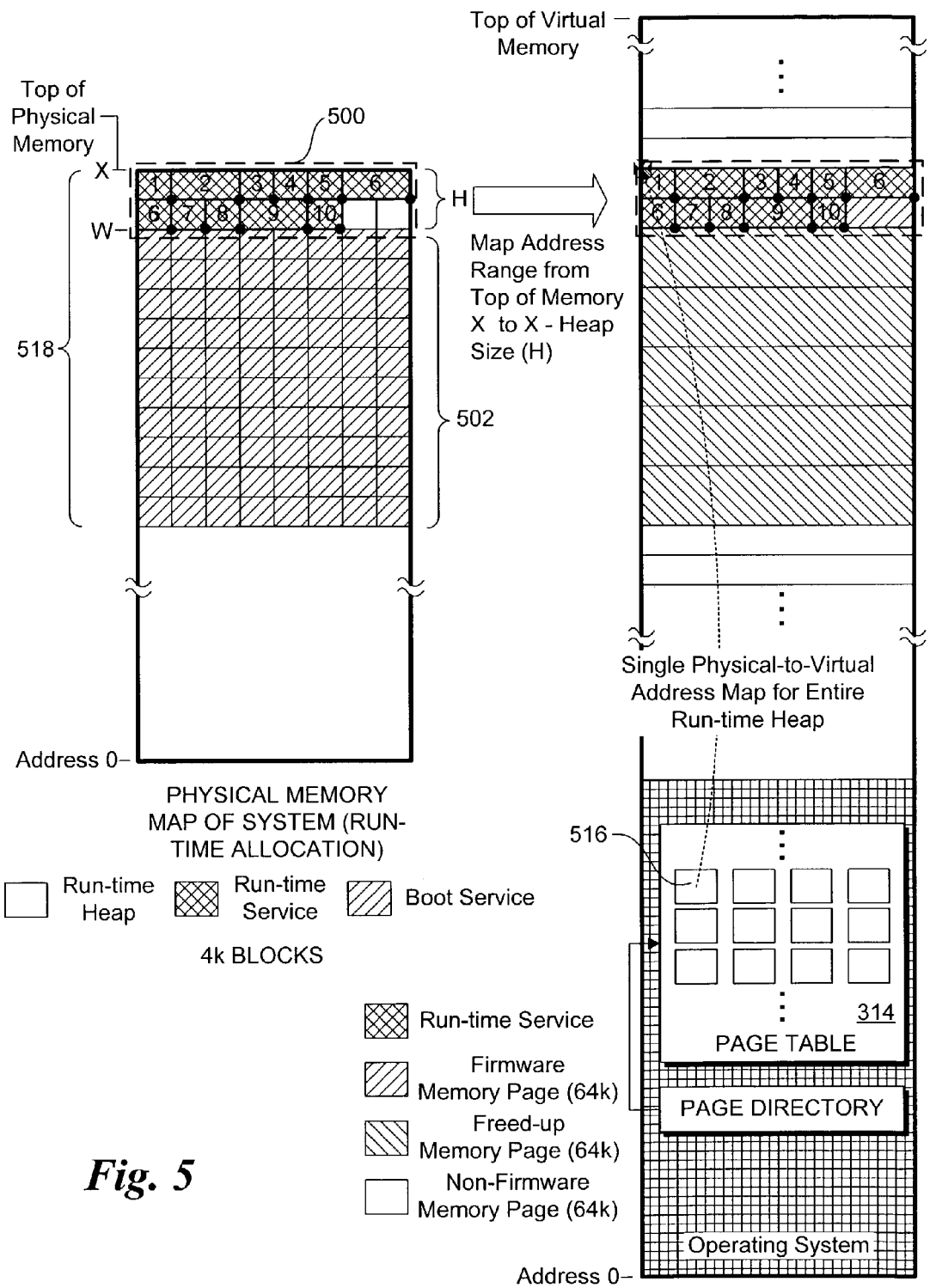
FIG. 5 is schematic diagram analogous to the diagram of FIG. 3, wherein the firmware components are selectively loaded in accordance with the flowchart of FIG. 4, resulting in coalescing of the run-time services in a single memory heap that may be virtually mapped using a single page table entry.

Next, in a block 404 the latest value of a watermark scale $W_S$ is retrieved from a persistent store, such as a system's non-volatile memory (e.g., flash). As described below in further detail, the watermark scale is used to determine an optimal size of a heap of memory to allocate for run-time firmware services. In one embodiment $W_S$ is a percentage, and S*WS bytes of memory are reserved immediately below X for runtime firmware allocations in a block 406. This reserved portion of memory is also referred to as the run-time heap, and in one embodiment corresponds to the minimum size of memory that is required to store all of the run-time firmware services for a particular platform. An exemplary run-time heap having a size H of 64 k is depicted in FIG. 5.

The remaining portion of the flowchart includes operations that are performed using an iterative process until all boot and run-time firmware services have been loaded. This iteration begins in a start loop block 408 in which a next firmware component is loaded, and servicing of any corresponding memory request allocations is initiated. In a decision block 410 a determination is made to whether the memory allocation request corresponds to a runtime service (as identified by firmware type information in the firmware component's header). If the answer is YES (TRUE), the logic proceeds to a decision block 412 in which a determination is made to whether there is sufficient memory left in the current run-time heap corresponding to the memory allocation request. If the answer is YES (TRUE) one or more memory blocks corresponding to the size of the request allocation (rounded up) for the firmware component are allocated in the run-time heap in a block 414, enabling the firmware component code to be loaded into the newly allocated memory block(s). In the case in which the firmware component provided boot-only services, the answer to decision block 410 will be NO (FALSE), causing the logic to proceed to a block 415 in which memory corresponding to the component's request is allocated to the next available memory block(s) below the watermark.

After memory is allocated in one of blocks 414 or 415, the logic proceeds to a decision block 416 in which a determination is made to whether the system boot has been completed, thereby enabling the OS to boot. The answer to this determination will be NO until sufficient firmware components have been loaded and/or executed to perform any required system boot operations. Until this point, subsequent firmware components will be loaded in a similar manner, as depicted by an end loop block 418, which returns the logic to begin processing a next firmware component in accordance with start block 408.

As the loading of each run-time firmware component is performed, the determination of decision block 412 will be evaluated to ensure there is sufficient memory available in the run-time heap to load that component. In accordance with an aspect of the invention, the size of the run-time heap is self-adjustable, enabling an optimal size for a particular platform configuration to be determined on an individual basis. As discussed above, this process begins by setting the current size of the run-time heap based on the latest watermark scale value $W_S$. If a current amount of memory reserved for run-time service allocation is insufficient, the answer to decision block 412 is NO (FALSE), and the logic proceeds to a block 420 in which the watermark scale $W_S$ is adjusted by a watermark stride so as to incrementally lower the resultant watermark. For example, if the watermark scale is a percentage, the watermark stride could likewise be a percentage, or could comprise an nominal percentage to be added or subtracted from the previous watermark scale value to obtain an updated watermark scale value. Upon this update, the system is then reset, returning the logic to block 400, whereupon the system boot process is repeated using a new (larger) run-time heap.

As discussed above, various firmware components will be loaded and/or executed until the system boot is completed, at which point the OS boot may be launched. This corresponds to a YES (TRUE) determination for decision block 416, which results in the logic proceeding to a decision block 422 in which a determination is made to whether there is more unused memory in the run-time heap than the amount of heap-size reduction that would occur based on a corresponding reduction in the watermark (based on the watermark stride). If the answer is YES, the watermark scale is retrieved, increased by the watermark stride, and stored in a block 424. The process is then completed after either a NO result from decision block 422 or a completion of block 424 by handing off the systems physical memory map to the operating system in a block 426.

The foregoing process may be repeated one or more times to adjust the run-time heap size to an optimal value. At first glance, one may wonder why the heap size would need to be changed once an optimal size was determined. In modern computer systems, most firmware devices comprise flash memory devices, which provide a non-volatile storage means that may be rewritten. As such, an original set of firmware code may be augmented or replaced with new firmware code, including new PEIMs and DXE drivers. Furthermore, under EFI, firmware may be loaded from other peripheral devices that are subsequently added to a platform (e.g., via option ROMs contained on those peripheral devices. Finally, firmware may be loaded during system boot from non-memory persistent storage means, such as hard discs, CD ROM drives, and over computer networks. As a result, the amount of memory consumed by the run-time firmware services may change over time.

Figure 4:
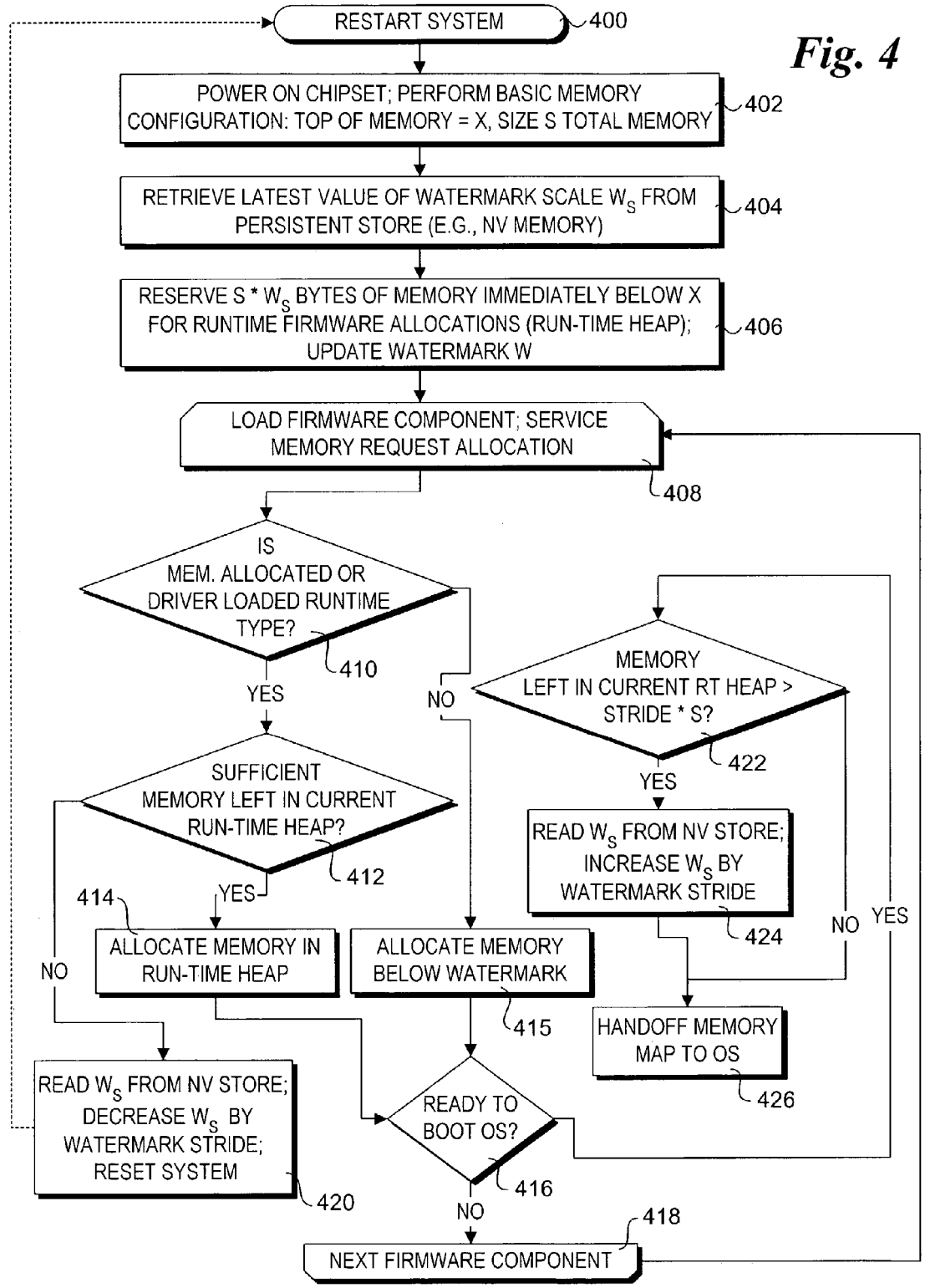
FIG. 4 is a flowchart illustrating the logic and operations performed by one embodiment of the invention to allocate system memory during system boot in a manner that coalesces run-time services into a single memory heap.

The results of an exemplary implementation of the scheme in accordance with the flowchart of FIG. 4 is diagrammatically illustrated in FIG. 5. The previously scattered run-time services are coalesced in the run-time heap 500. Watermark W defines the bottom of the run-time heap. While the run-time services are being loaded into the run-time heap, memory requests from boot services are allocated to memory blocks below the watermark.

Rather than map the entire portion of physical memory 518 occupied by the run-time and boot services at the time of OS boot, only the run-time heap is mapped by the operating system. If all of the run-time heap fits into a single virtual memory page, than only a single PTE 516 will need to be included in page table 314. If the run-time heap spans more than one virtual memory page, than the number of page table entries included in the page table will match the number of pages consumed. Since the portion of memory 502 below the watermark that is occupied by boot services is not mapped into virtual memory, an equivalent number of pages required to store this portion of memory are freed (when compared with the prior art scheme of FIG. 3). Thus, in accordance with aspects of the invention, the scheme improves both memory availability and substantially reduces the number of page table entries employed to provide virtual mapping by the operating system.

In one embodiment the page table entries comprise offsets between the location (starting address) of the firmware heap in physical memory (e.g., at the top of the system's memory) and the location of the corresponding virtual memory page as view by the operation system. In the case that virtual paging size is sufficient to hold the entire run-time heap, the single PTE will comprise a single offset representing the difference between the base address of the virtual memory page and the base address of the run-time heap.

It is noted that variations on the scheme referencing the flowchart of FIG. 4 may be employed to produce similar results. For example, rather than storing and updating a watermark scale, a run-time heap value may be stored. The run-time heap value would then be adjusted upward or downward, as necessary, to optimize the run-time service memory allocation. As another option, rather than employing a numerical watermark stride (e.g., a small percentage), they scheme may be arranged such that the incremental change in the run-time heap size H corresponds with the paging size of the OS and/or processor architecture. For instance, if it was determined that an insufficient heap size was originally allocated, the adjusted heap size could be selected to coincide with a paging size boundary (e.g., N×paging size), thereby maximizing the efficiency of the solution.

Figure 6:
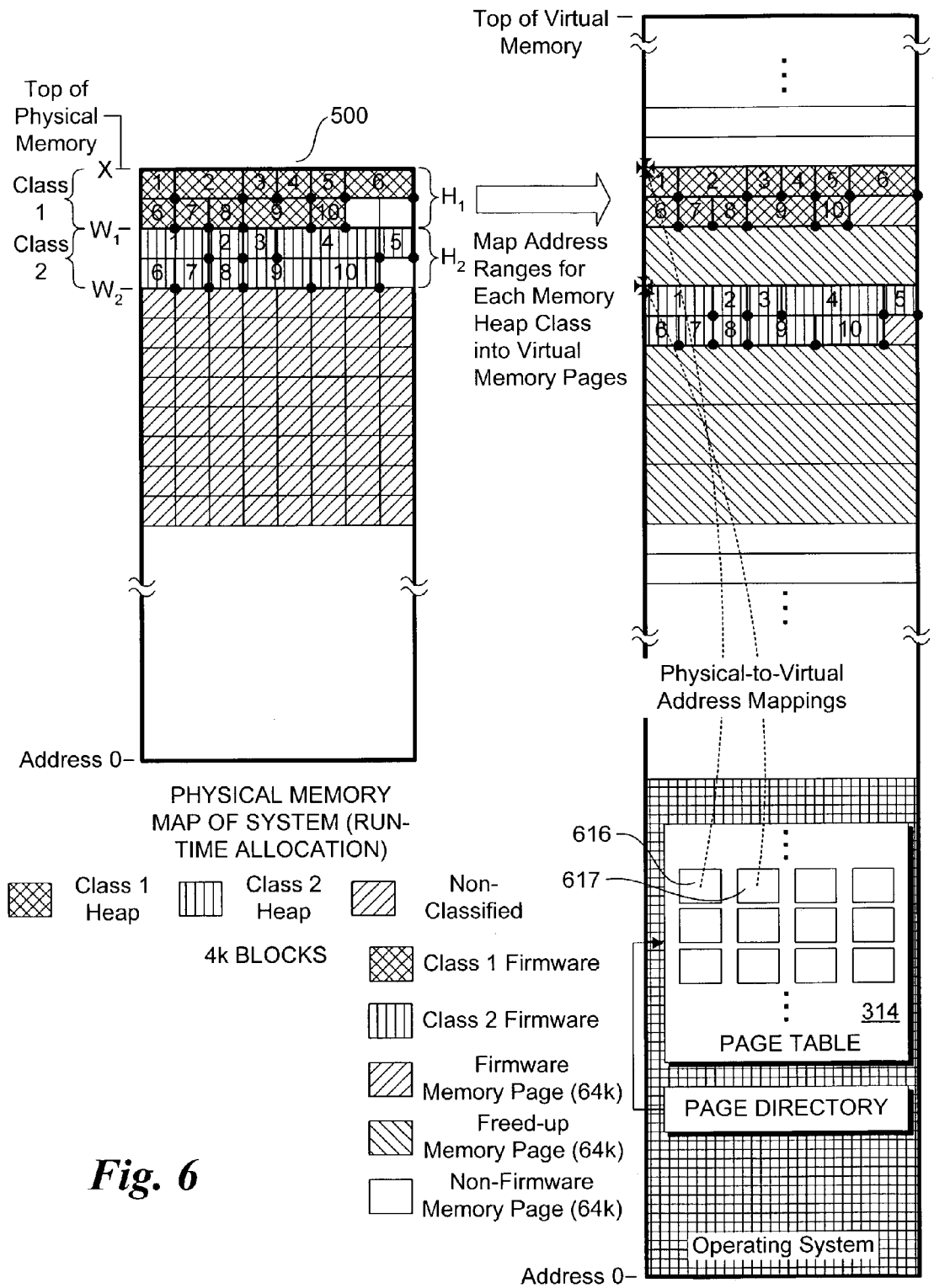
FIG. 6 is a schematic diagram analogous to the diagrams of FIGS. 3 and 5 in which an embodiment in which multiple memory heaps are employed for storing firmware corresponding to respective firmware classes.

In accordance with the principles and teachings of the invention, the foregoing scheme illustrated in FIGS. 4 and 5 may be generalized to encompass the coalescing of firmware services based on class assignments. For example, as respective memory heaps may be allocated for a predefined number of classes, such as depicted by Class Heaps 1 and 2 in FIG. 6. The heaps for these classes would in turn have a respective heap size $H_1$ and $H_2$, with the boundaries for the heaps defined by respective markings, such as watermarks $W_1$ and $W_2$.

During system boot, the various firmware components are examined to determine which class, if any, they belong to. For example, the class of various firmware components could be stored in that component's code, such as in a firmware header in a manner similar to that employed by EFI-compliant firmware modules and drivers. Memory allocations and loading of each firmware component would pertain to its class and corresponding memory heap availability, wherein the size of each memory heap could be automatically adjusted in a similar manner to that discussed above with respect to the run-time heap of FIG. 5. Non-classified firmware, of firmware assigned to a default class, for example, would be loaded into a non-heap portion of the system memory, such as below watermark $W_2$ in FIG. 6. Once the system boot is complete, a system memory map representing the current memory usage may be handed off to the OS to enable the OS to then derive virtual address mappings 616 and 617 for the respective memory heap classes. In accordance with this scheme, memory allocation may be further extended such that the number of classes is not limited to just two classes, but may include N classes, wherein selected classes could be allocated corresponding physical memory heaps, and appropriate virtually memory mappings would be employed to access pages of memory containing firmware code for those selected classes. While these classes may include the aforementioned Runtime Memory type (i.e., EfiRuntimeServicesCode and EfiRuntimeServicesData classes), they can additionally involve other firmware reserved memory types (as defined by the EfiACPIMemoryNVS class). The value of this is that the ACPI memory could be placed in a heap (at the top of memory, for example), followed by the EFI Runtime Memory in a second heap. This ordering is useful because if the EFI system boots a legacy operating system, only the ACPI memory would appear in the legacy Int15h, E820h memory map; having the ACPI at "the top" means that the legacy OS can reclaim all of the rest of memory, including EFI Runtime (which isn't supported by the legacy OS, and thus not virtually mapped). But for an EFI-compliant OS, which keeps both the runtime and ACPI memory, this segregation and mapping to the top accrues the aforementioned mapping advantages.

An additional motivation for implementing a configuration with multiple classes is that a policy could be set up whereby some memory preserved by the OS, such as the ACPI and Runtime listed above, may have different cacheability. For example, the OS may want to virtually map both classes, while having the ACPI region mapped as uncached and the Runtime mapped as cacheable. Under processors having Intel's IA32 architecture, for example, cacheability is controlled by the Page Attribute Table (PAT), which is essentially part of the paging mechanism. As such, segregating classes and disambiguating boundaries of classes is important so that pages with different cacheability attributes (not just size/boundary constraints) are strictly segregated.

Under the EFI framework, multiple class heaps may be accessed through setting appropriate variables and the like. For example, during PEI phase 114, a primordial memory-map is created and is passed to DXE framework 126. As such, any initial memory allocation policies have to be supported by PEI. For example, if a PEIM allocates ACPI reserved memory, this allocation should fit into the appropriate region heap. The policy of the watermarks can be conveyed to both PEI and DXE through an EFI variable. This variable, with its associated watermarks, may be set by the DXE framework based upon "discovered" heap usage patterns.

Figure 7:
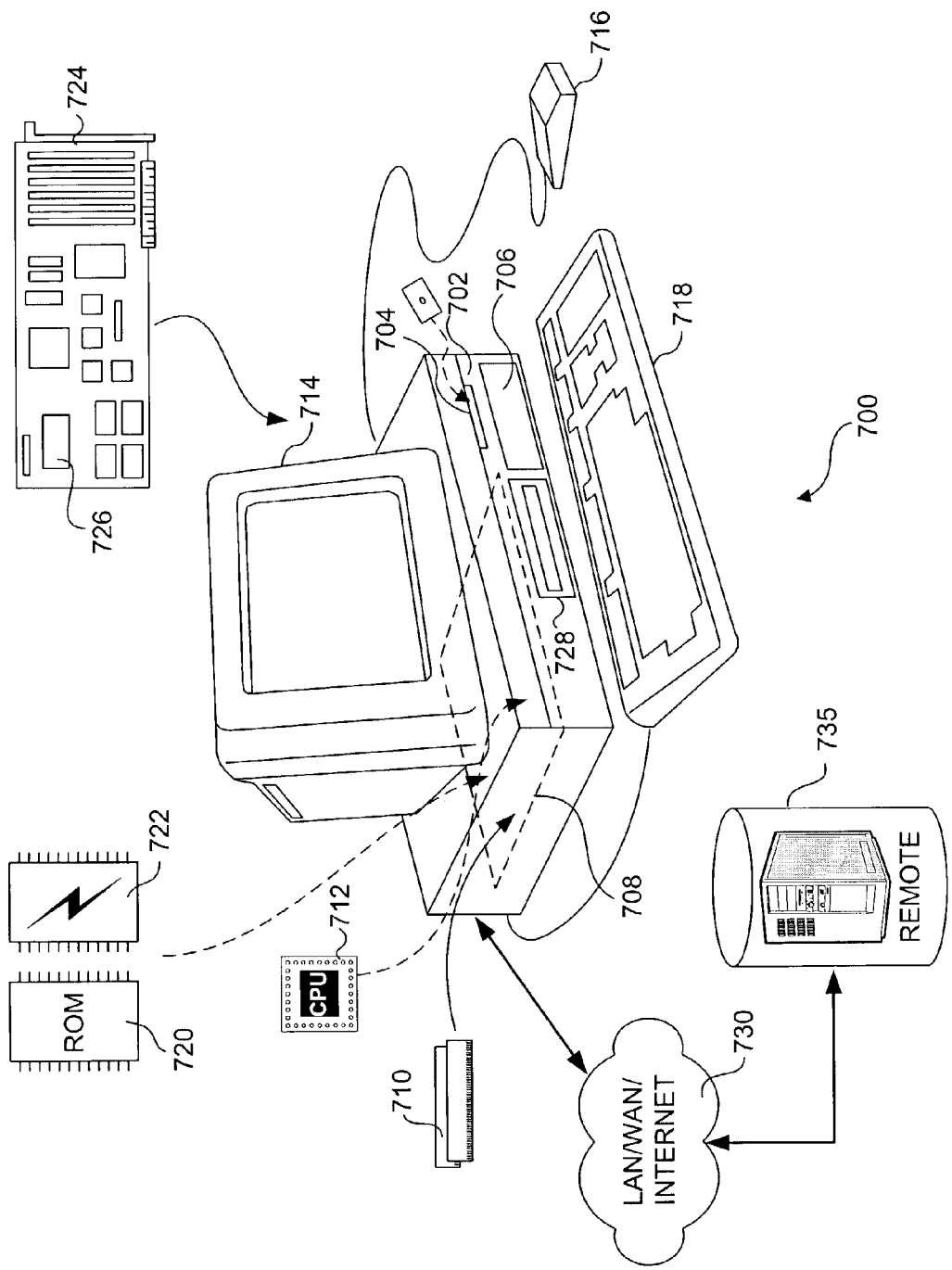
FIG. 7 is a schematic diagram illustrating a computer system that may be used to practice the illustrated embodiments of the present invention.

FIG. 7 illustrates an embodiment of an exemplary computer system 700 for practicing the embodiments of the invention described above. Computer system 700 is generally illustrative of various types of computer devices, including personal computers, laptop computers, workstations, servers, etc; for simplicity, only the basic components of the computer system are discussed herein. Computer system 700 includes a processor chassis 702 in which various hardware components are housed, including a floppy disk drive 704, a hard disk 706, a power supply (not shown), and a motherboard 708 populated with appropriate integrated circuits including system memory 710 coupled to one or more processors 712. Hard disk 706 may comprise a single unit, or multiple units, and may optionally reside outside of computer system 700. The system also includes a boot firmware device on which firmware is stored, which may typically comprise non-volatile memory such as a ROM device 720 or a flash device 722. The motherboard may include other firmware devices as well (not shown). In general, the system's processors will comprise 32- or 64-bit architectures, and the system memory will include physical addressing schemes appropriate to the processor(s), and may be accessed via corresponding address and data buses to which the processor(s) and the memory are connected.

A monitor 714 is included for displaying graphics and text generated by firmware, software programs and program modules that are run by computer system 700, such as system information presented during system boot. A mouse 716 (or other pointing device) may be connected to a serial port, USB port, or other like bus port communicatively coupled to CPU(s) 712. A keyboard 718 is communicatively coupled to motherboard 708 in a similar manner as mouse 716 for user entry of text and commands. In one embodiment, computer system 700 also includes a network interface card NIC or built-in NIC interface (not shown) for connecting computer system 700 to a computer network 730, such as a local area network (LAN), wide area network (WAN), or the Internet. In one embodiment network 730 is further coupled to a remote computer 735, such that computer system 700 and remote computer 735 can communicate. In one embodiment, a portion of the system's firmware is loaded during system boot from remote computer 735.

The illustrated embodiment further includes an optional add-in card 724 that is coupled to an expansion slot of motherboard 708. In one embodiment, add-in card 724 includes an Option ROM 726 on which firmware is stored. Computer system 700 may also optionally include a compact disk-read only memory ("CD-ROM") drive 728 into which a CD-ROM disk may be inserted so that executable files and data on the disk can be read or transfer into system RAM 710 and/or hard disk 706, such as an operating system. Other mass memory storage devices may be included in computer system 700.

Thus, embodiments of this invention may be used as or to support a firmware and software code executed upon some form of processing core (such as processor 712) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

The above description of illustrated embodiments of the invention, including what is described in the Abstract, is not intended to be exhaustive or to limit the invention to the precise forms disclosed. For example, as described above, the various firmware components and operations are defined to correspond to the EFI framework. This is not meant to be limiting, as the principles and teachings of the invention can be applied to various types of firmware environment. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method comprising:
    defining a memory heap comprising a portion of a computer system memory in which a first class of firmware components are to be loaded; and
    selectively loading firmware components into the system memory, wherein firmware components corresponding to the first class are loaded into the memory heap, while other firmware components are loaded into other portions of the system memory.

2. The method of claim 1, wherein the first class of firmware components comprise run-time firmware services.

3. The method of claim 1, further comprising:
    determining a minimum number of virtual memory pages defining a storage space in which the memory heap will fit;

allocating memory pages in virtual memory corresponding to said minimum number of virtual memory pages; and defining mapping information for accessing the firmware components in the memory heap via corresponding calls to virtual addresses contained in the virtual memory pages that are allocated.

4. The method of claim 3, wherein the minimum number of virtual memory pages is one, and the mapping information comprises a single page table entry in a virtual memory page table comprising an offset that maps addresses of firmware components in the memory heap to corresponding virtual memory addresses in a single virtual memory page.

5. The method of claim 1, further comprising:
defining an offset between a base address corresponding to a location of the memory heap and a corresponding portion of virtual memory to which the memory heap is mapped; and
accessing a firmware component stored in the memory heap by de-referencing a virtual address of the firmware component via the offset.

6. The method of claim 1, wherein the memory heap is located at the top of the computer system's physical memory.

7. The method of claim 6, further comprising defining a memory address watermark above which only firmware components of the first class may be loaded.

8. The method of claim 1, further comprising sequentially allocating memory blocks contained in the memory heap to firmware components of the first class as those firmware components are loaded.

9. The method of claim 1, further comprising automatically determining an optimum size of the memory heap, said optimum size corresponding to a minimum number of virtual memory pages in which all of the firmware components corresponding to the first class fit.

10. The method of claim 1, wherein the memory heap comprises a first memory heap, the method further comprising defining a second memory heap comprising a portion of the computer system memory in which a second class of firmware components are to be loaded, wherein as firmware components are selectively loaded into the system memory, firmware components corresponding to the first class are loaded into the first memory heap, firmware components corresponding to the second class are loaded into the second memory heap, while other firmware components are loaded into other portions of the system memory.

11. The method of claim 10, further comprising:
determining a minimum number of virtual memory pages defining a storage space in which the second memory heap will fit;
allocating memory pages in virtual memory corresponding to said minimum number of virtual memory pages; and
defining mapping information for accessing the firmware components stored in the second memory heap via corresponding calls to virtual addresses contained in the virtual memory pages that are allocated.

12. A tangible machine-readable medium on which firmware is stored, said firmware including instructions that are executable by a computer system to perform operations comprising:
partitioning off a portion of system memory in the computer system to create a run-time service heap; and
selectively loading firmware services into the system memory during system boot, wherein run-time firmware services are loaded into the run-time service heap, while boot firmware services are loaded into other portions of the system memory.

13. The tangible machine-readable medium of claim 12, wherein execution of the instructions further causes the computer system to determine an optimum size of the run-time service heap.

14. The tangible machine-readable medium of claim 13, wherein the optimum size of the run-time service heap is determined by:
partitioning off a portion system memory corresponding to an initial size for the run-time service heap;
monitoring available space remaining in the run-time service heap as firmware services are loaded into memory; and
adjusting the size of the run-time service heap such that the size of the heap is sufficient to store all of the run-time services while leaving an available space that is less than a size of a virtual memory page corresponding to one or more virtual memory pages into which the run-time heap is to be mapped.

15. The tangible machine-readable medium of claim 14, wherein execution of the instructions further causes the computer system to determine the optimal size of the run-time heap by:
determining, as firmware services are being loaded, whether a sufficient amount of memory is available in the run-time service heap to fulfill a memory allocation request for a given run-time firmware service; and if not,
storing indicia reflecting an increase in the size of the run-time firmware heap; and
initiating a subsequent system boot to cause the firmware services to be selectively reloaded into system memory using a run-time service heap having the increased size.

16. The tangible machine-readable medium of claim 14, wherein execution of the instructions further causes the computer system to determine the optimal size of the run-time heap by:
determining, after all firmware services are loaded during system boot, whether an amount of the run-time service heap remaining unused exceeds a virtual memory page size to be employed by an operating system to be loaded subsequent to the system boot; and if it does,
performing one of storing or updating information on a non-volatile device of the computer system corresponding to the size of the run-time heap such that a decrease in the size of the run-time heap is reflected during a subsequent system boot of the computer system.

17. The tangible machine-readable medium of claim 12, wherein the system memory is portioned such that the run-time service heap is located between a top of physical memory and a watermark below which the boot services are loaded.

18. The tangible machine-readable medium of claim 12, wherein execution of the instructions further causes the computer system to hand-off a system memory map to an operating system identifying a location of runtime services in system memory at operation system launch.

19. The tangible machine-readable medium of claim 12, wherein the medium comprises a non-volatile memory.

20. A computer system, comprising:
a processor;
system memory, operatively coupled to the processor; and
at least one firmware device operatively coupled to the processor on which firmware instructions are stored, which when executed by the processor during system boot performs the operations of:

retrieving memory heap size indicia stored by the computer system;

determining a size of a memory heap to be allocated based on the memory heap size indicia;

partitioning off a portion of the system memory in which a memory heap having the determined size is to be located; and selectively loading firmware components into the system memory, wherein firmware components corresponding to a first class are loaded into the memory heap, while other firmware components are loaded into other portions of the system memory.

21. The computer system of claim 20, wherein said at least one firmware device includes at least two different types of firmware devices from which the firmware components are loaded.

22. The computer system of claim 20, wherein execution of the firmware instructions determines the size of the memory heap by performing further operations including:

determining a total size of the system memory; and calculating the memory heap size as a function of the memory heap size indicia and the total size of the system memory.

23. The computer system of claim 20, wherein execution of the firmware instructions defines the location of the memory heap by performing further operations including:

determining a top of memory address for the computer system; and partitioning off a contiguous portion of memory having addresses ranging from a watermark to the top of memory address; said contiguous portion of memory having a size corresponding to the size determined for the memory heap.

24. The computer system of claim of 23, wherein firmware components corresponding to the first class are loaded into the memory heap so as to occupy sequential memory blocks contained in the memory heap.

25. The computer system of claim of 23, wherein firmware components not corresponding to the first class are loaded into the system memory below the watermark so as to occupy sequential memory blocks below the watermark.

26. The computer system of claim 20, wherein the memory heap size indicia comprises a scaling factor.

27. The computer system of claim 20, wherein execution of the firmware instructions automatically determine an optimum size of the memory heap by performing the operations of:

portioning off a memory heap corresponding to an initial size defined by the memory heap size indicia;

monitoring available space remaining in the memory heap as firmware components corresponding to the first class are loaded into the heap; and adjusting the size of the memory heap such that the size of the heap is sufficient to store all of the firmware components corresponding to the first class while leaving an amount of unused space that is less than a size of a virtual memory page corresponding to one or more virtual memory pages into which the memory heap is to be mapped.

28. The computer system of claim 27, wherein execution of the firmware instructions determines the optimal size of the memory heap by performing the operations of:

determining, as firmware components are being loaded during system boot, whether a sufficient amount of the memory heap is available for fulfilling a memory allocation request for a given firmware component corresponding to the first class; and if not, increasing the size of the heap via updating the memory size indicia; and initiating a subsequent system boot to cause the firmware components to be selectively reloaded into system memory using a run-time heap having the increased size.

29. The computer system of claim 27, wherein execution of the firmware instructions determines the optimal size of the memory heap by performing the operations of:

determining, after all firmware components are loaded during system boot, whether an amount of the memory heap remaining unused exceeds a virtual memory page size to be employed by an operating system to be subsequently loaded after completion of the system boot; and if it does, updating the memory heap size indicia such that a decrease in the size of the memory heap is reflected during a subsequent system boot of the computer system.

30. The computer system of claim 20, wherein the first class of firmware components correspond to run-time services.

* * * * *